US012791718B2

(12) United States Patent
Greenberg

(10) Patent No.: US 12,791,718 B2
(45) Date of Patent: Nov. 10, 2026

(54) FRAMED GEIGER-MODE LADAR SYSTEM WITH OPTIMAL FRAME RATE SELECTION AND METHOD FOR SELECTION OF OPTIMAL FRAME RATE

(71) Applicant: Raytheon Company, Arlington, VA (US)

(72) Inventor: Adam Hodge Greenberg, Gardena, CA (US)

(73) Assignee: Raytheon Company, Arlington, VA (US)

( * ) Notice: Subject to any disclaimer, the term of this patent is extended or adjusted under 35 U.S.C. 154(b) by 407 days.

(21) Appl. No.: 18/529,838

(22) Filed: Dec. 5, 2023

(65) Prior Publication Data

US 2025/0180718 A1 Jun. 5, 2025

(51) Int. Cl.

| | |
|---|---|
| ***G01S 17/89*** | (2020.01) |
| ***G01S 7/486*** | (2020.01) |
| ***G01S 7/4863*** | (2020.01) |
| ***G01S 7/4865*** | (2020.01) |
| ***G01S 17/18*** | (2020.01) |

(52) U.S. Cl.

CPC ............ *G01S 17/89* (2013.01); *G01S 7/4863* (2013.01); *G01S 7/4866* (2013.01); *G01S 17/18* (2020.01)

(58) Field of Classification Search

CPC ........ G01S 17/18; G01S 7/484; G01S 7/4866; G01S 17/89

See application file for complete search history.

(56) References Cited

U.S. PATENT DOCUMENTS

| | | | |
|---|---|---|---|
| 10,386,487 B1 | 8/2019 | Wilton et al. | |
| 10,597,788 B2 | 3/2020 | Reytier et al. | |
| 11,525,920 B2 | 12/2022 | Greenberg et al. | |
| 11,561,291 B2 | 1/2023 | Marcus et al. | |
| 2022/0206152 A1 | 6/2022 | Greenberg et al. | |
| 2022/0308215 A1* | 9/2022 | Dussan | G02B 26/0816 |
| 2025/0180720 A1* | 6/2025 | Hopper | G01S 7/4815 |

FOREIGN PATENT DOCUMENTS

| | | | |
|---|---|---|---|
| KR | 20200110451 A | 9/2020 | |
| WO | WO-2019069260 A1 * | 4/2019 | G01S 17/931 |
| WO | WO-2021048096 A1 * | 3/2021 | A61F 9/00825 |

OTHER PUBLICATIONS

Otto, "Delay-Induced Dynamics and Jitter Reduction of Passively Mode-Locked Semiconductor Lasers Subject to Optical Feedback", Nov. 22, 2012, New Journal of Physics (Year: 2012).*

* cited by examiner

*Primary Examiner* — Helal A Algahaim
*Assistant Examiner* — Benjamin David Wigger
(74) *Attorney, Agent, or Firm* — Schwegman Lundberg & Woessner, P.A.

(57) ABSTRACT

A framed Geiger-mode laser detection and ranging (LADAR) system includes signal processing circuitry configured to select an initial frame rate to maximize sensitivity of a Geiger-mode Avalanche Photodiode (GmAPD) detector. The signal processing circuitry may adjust the initial frame rate to reduce and/or remove system resonances to determine a final (i.e., more-optimal) frame rate. The signal processing circuitry may process LADAR pulse returns using the final frame rate. The initial frame rate may be an initial optimal anti-blocking frame-rate determined from a background rate of the LADAR system, a read-out period of the GmAPD detector, and the Lambert W function. The initial frame rate may be adjusted to remove resonances using an Nth order Farey sequence to determine the final frame rate.

17 Claims, 4 Drawing Sheets

FRAMED GEIGER-MODE LADAR SYSTEM WITH OPTIMAL FRAME RATE SELECTION AND METHOD FOR SELECTION OF OPTIMAL FRAME RATE

GOVERNMENT RIGHTS

This disclosure was made with Government support. The Government has certain rights in the disclosure.

TECHNICAL FIELD

Embodiments pertain to pulsed laser radar sensors and systems, including Light Detection and Ranging (LIDAR) systems and Laser Detection And Ranging (LADAR) systems. Some embodiments pertain to framed Geiger-mode LADAR systems.

BACKGROUND

Laser Detection and Ranging (LADAR) is a laser-based radar technology used to capture high-resolution imaging information and to measure distances by illuminating a target object or terrain with laser light. LADAR has been used to create high resolution survey maps of geographic areas and detailed 3-D images of objects. More recently, LADAR has been implemented to support control and navigation of autonomous cars. LADAR uses ultraviolet, visible, or near infrared light to image objects or terrains. Using a narrow laser beam, a LADAR system can detect physical features of objects with extremely high resolutions.

Framed Geiger-mode LADAR systems use an avalanche photodiode operated above its breakdown voltage so that a single photon detection can trigger a large electrical pulse allowing for high sensitivity. In a framed Geiger-mode LADAR system, the field of view is divided into discrete frames which are scanned sequentially by steering the laser beam allowing 3D imaging of a scene over time. Framed Geiger-mode LADAR systems provide high sensitivity for long range detection, high spatial resolution for detailed 3D images, and the ability to capture 3D video by scanning frames quickly which are particularly beneficial for remote sensing, collision avoidance, and 3D mapping applications that are not possible with standard LADAR.

One issue with framed Geiger-mode LADAR systems is achieving high sensitivity. A reduction in sensitivity reduces the ability of the system to detect weak return signals. The sensitivity of the detector is critical for these systems to be able to detect faint reflections from distant objects or surfaces. If the sensitivity is reduced due to resonances, it limits the operating range and performance of the system. A reduction in sensitivity can create blind spots or gaps in the data. If the resonances cause decreased sensitivity at certain wavelengths or distances, it may mean there are holes in the spatial coverage or resolution of the system. This missing data could be critical for applications like obstacle detection or mapping. A reduction in sensitivity requires more laser power to compensate. To overcome the loss of sensitivity, more laser power may be needed to get detectable return signals. This increases size, cost and heat for the laser transmitter. A reduction in sensitivity complicates signal processing and calibration. The variable loss versus wavelength has to be measured and compensated for in processing the return data. This adds complexity to properly interpret and make use of the LADAR data.

Thus there are general needs for framed Geiger-mode LADAR systems with improved sensitivity.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to framed Geiger-mode LADAR systems with improved sensitivity. Some embodiments are directed to selection of an optimal frame rate in framed Geiger-mode LADAR systems. Some embodiments are directed to selection of an optimal frame rate in framed Geiger-mode LADAR systems by removal of camera/laser resonances. These embodiments are described in more detail below.

In some embodiments, a framed Geiger-mode LADAR system includes signal processing circuitry configured to select an initial frame rate to maximize sensitivity of a Geiger-mode Avalanche Photodiode (GmAPD) detector. In these embodiments, the signal processing circuitry may adjust the initial frame rate to reduce and/or remove system resonances to determine a final (i.e., more-optimal) frame rate. In these embodiments, the signal processing circuitry may process LADAR pulse returns using the final frame rate. In some of these embodiments, the initial frame rate may be an initial optimal anti-blocking frame-rate determined from a background rate of the LADAR system, a read-out period of the GmAPD detector, and the Lambert W function. In some embodiments, the initial frame rate may be adjusted to remove resonances using an Nth order Farey sequence. These embodiments, as well as others, are described in more detail below.

Figure 1:
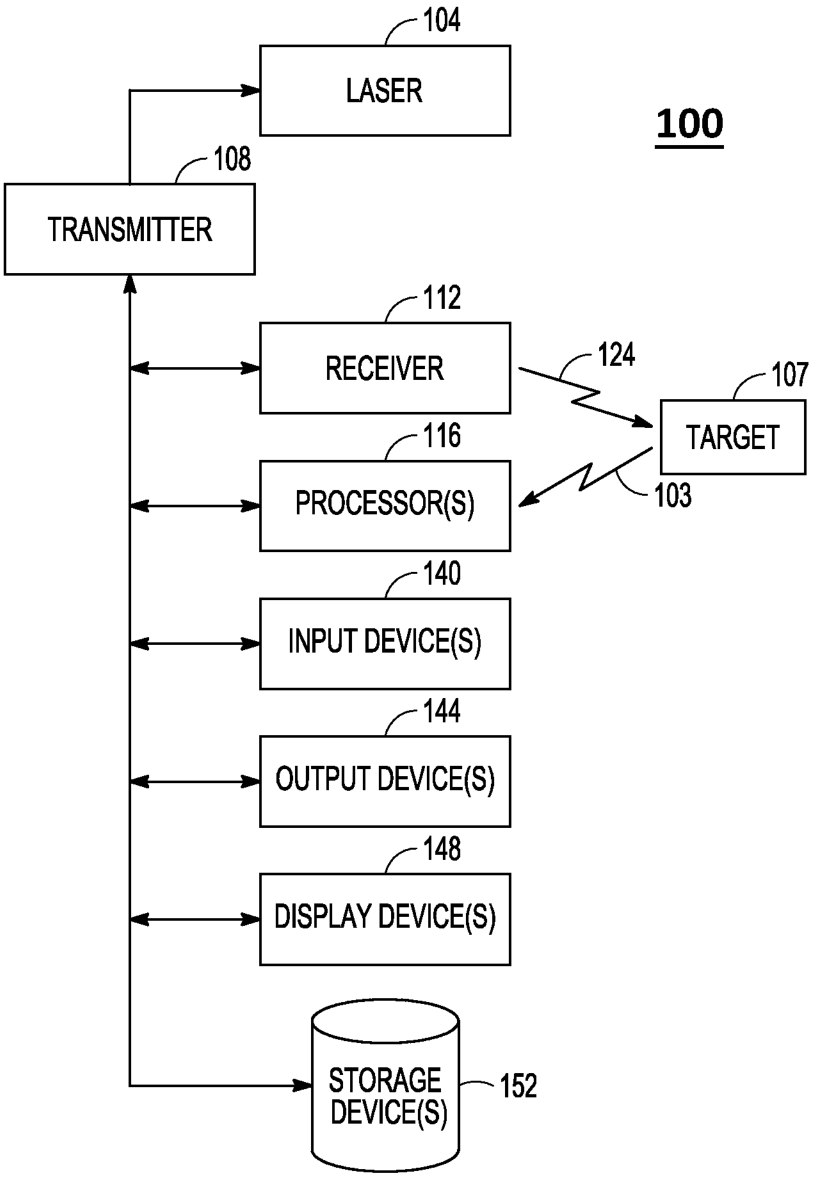
FIG. 1 is a functional diagram of a LADAR system in accordance with some embodiments.

FIG. 1 is a functional diagram of a LADAR system in accordance with some embodiments. As shown, a LADAR platform includes a laser 104, a laser transmitter 108 (which is connected to the laser 104 as shown, or which may contain the laser 104) and a receiver 112. The transmitter 108 sends LADAR transmission pulses 124 towards one or more targets 107 within a region of interest. LADAR return pulses (samples) 103 are generated in response to the LADAR transmission pulses reflecting off of a plurality of objects (targets) within the region of interest. In some embodiments, the echo from each target (as seen at the receiver) is a version of the transmitted signal that is 1) time delayed by the transit time from transmitter to target to receiver, 2) time compressed or time dilated due to target motion, and 3) attenuated by some factor. The receiver observes a return signal consisting of each of the target echoes (plus random noise).

System 100 also includes one or more input devices 140, one or more output devices 144, one or more display devices 148, one or more processing circuits 116 (discussed in further detail below), and one or more storage devices 152. Processing circuits 116 may comprise one or more processors. The modules and devices described herein can, for example, utilize the one or more processing circuits 116 to execute computer executable instructions and/or the modules and devices described herein and may include their own processor to execute computer executable instructions. As known in the art, the one or more processing circuits 116 include their own memories, such as RAMs and ROMs to store and execute program instructions. One skilled in the art would understand that the system 100 can include, for example, other modules, devices, and/or processors known in the art and/or varieties of the described modules, devices, analog-to digital converters (ADCs), digital-to-analog converters (DACs), and/or processors. In some embodiments, the receiver includes one or more (e.g., an array of) detectors.

The input devices 140 receive information from a user and/or another computing system. The input devices 140 can include, for example, Bluetooth interface, WiFi interface, network interface, a keyboard, a scanner, a microphone, a stylus, a touch sensitive pad or display, which may be suitable for displaying digital data. The output devices 144 output information associated with the system 100 (e.g., information to remote devices, information to a speaker, information to a display, for example, graphical representations of information). The processing circuits 116 execute instructions for the system (e.g., applications). The storage devices 152 store a variety of information/data, including LADAR range data generated by the system 100 and prior measurements. The display devices 148 display information associated with the system 100, for example, target information including their position, distance, type and the like, status information, configuration information and the like. The storage devices 152 can include, for example, long-term storage, such as a hard drive, a tape storage device, or flash memory; short-term storage, such as a random-access memory, or a graphics memory; and/or any other type of computer readable storage. In some embodiments, the process according to the disclosure is performed by the processing circuits 116, utilizing some or all of the components illustrated in FIG. 1.

In operation, as mentioned above, the processing circuits 116 may (by controlling the laser transmitter 108) transmit a plurality of laser pulses and detect (through the receiver 112) a plurality of return pulses. Each return pulse may be caused by the detection of one or more return photons or by noise (e.g., detector noise, or photons from other sources). The LADAR system may, in operation, perform a series of "dwells" between which various system parameters (e.g., the pointing of the laser transmitter 108 and the receiver 112) may be changed.

The receiver 112 may be a direct-detect receiver, which directly detects laser light reflected from the target (without first combining the received signal with an optical local oscillator signal). Direct-detect LADAR systems with photon-counting detectors (e.g., with arrays of photon-counting detectors) may provide a highly sensitive means of active optical measurements for a wide variety of applications, such as three-dimensional imaging, mapping, object detection, segmentation, motion estimation or compensation, precision tracking, feature extraction, and target recognition. Their performance may be limited in part by transmitter average power, which may be difficult to maximize with the kHz pulse repetition frequency (PRF) and nanosecond pulse widths employed in some designs. A promising emerging technology is the use of all-fiber transmitters, which can attain much higher average power levels without sacrificing short pulse width, through waveforms with pulse rates on the order of at least 1 MHz. These transmitters, paired with compatible high-rate receivers, open up the possibility of direct-detect systems with significantly enhanced performance, as measured by metrics such as detection range, area coverage rate, map resolution, motion sensitivity, and feature fidelity, depending on the application. Furthermore, such systems may provide enhanced hardware and waveform commonality with other types of active optical devices, such as coherent LADARs, directed energy weapons, and communications terminals, thereby easing the path to practical implementation of advanced multifunction systems.

In some embodiments, system 100 may be configured to operate as a framed Geiger-mode laser detection and ranging (LADAR) system in which signal processing circuitry is configured to select an initial frame rate to maximize sensitivity of a Geiger-mode Avalanche Photodiode (GmAPD) detector. In these embodiments, the signal processing circuitry may adjust the initial frame rate to reduce and/or remove system resonances to determine a final (i.e., more-optimal) frame rate. In these embodiments, the signal processing circuitry may process LADAR pulse returns using the final frame rate. These embodiments are discussed in more detail below.

The following US patents and US patent applications are incorporated herein by reference: US20220206152A1 (entitled "SIX DIMENSIONAL TRACKING OF SPARSE LADAR DATA", U.S. Pat. No. 11,561,291 (entitled "HIGH PULSE REPETITION FREQUENCY LIDAR"; and U.S. Pat. No. 11,525,920 (entitled "SYSTEM AND METHOD FOR DETERMINING RANGE-RATE AND RANGE EXTENT OF A TARGET)".

Figure 2:
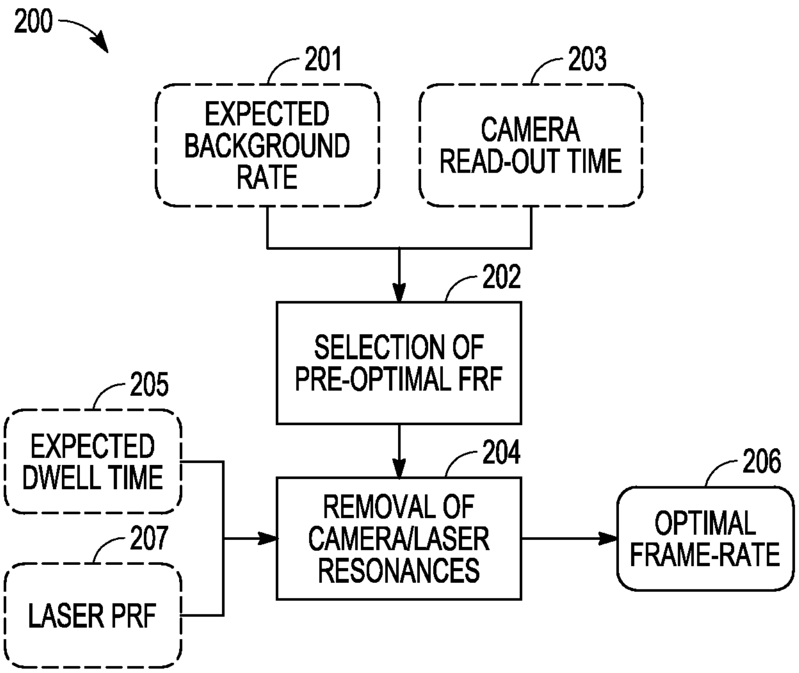
FIG. 2 illustrates an optimal frame rate selection process for a framed Geiger-mode LADAR system, in accordance with some embodiments.

FIG. 2 illustrates an optimal frame rate selection process, in accordance with some embodiments. The optimal frame rate selection process 200 may be performed by signal processing circuitry (e.g., processing circuits 116 (FIG. 1) of a framed Geiger-mode laser detection and ranging (LADAR) system. In some embodiments, in operation 202, the processing circuitry may select an initial frame rate to maximize sensitivity of a Geiger-mode Avalanche Photodiode (GmAPD) detector. In these embodiments, in operation 204, the processing circuitry may adjust the initial frame rate selected in operation 202 to reduce and/or remove system resonances to determine a final (i.e., more-optimal) frame rate 206. In these embodiments, LADAR pulse returns may be processed using the final frame rate 206.

In some embodiments, the initial frame rate may be a pre-optimal frame rate and the final frame rate may be an optimal frame rate which optimizes the overall detection probability based on a background rate 201 of the system and a camera read-out time 203. In some embodiments, the processing circuitry may adjust the initial frame rate selected in operation 202 based on an expected dwell time 205 and a pulse repetition frequency (PRF) 207 of the LADAR system.

In some embodiments, the following equation may be used which determines the frame-rate, $f_{max}$, which optimizes the overall detection probability, as a function of background rate $\lambda_b$ and read-out time $\tau$.

$$f_{max} = -\frac{\lambda_b}{w(-\exp(-(\lambda_b \tau + 1))) + 1}$$

where W is the Lambert W function.

Figure 3A:
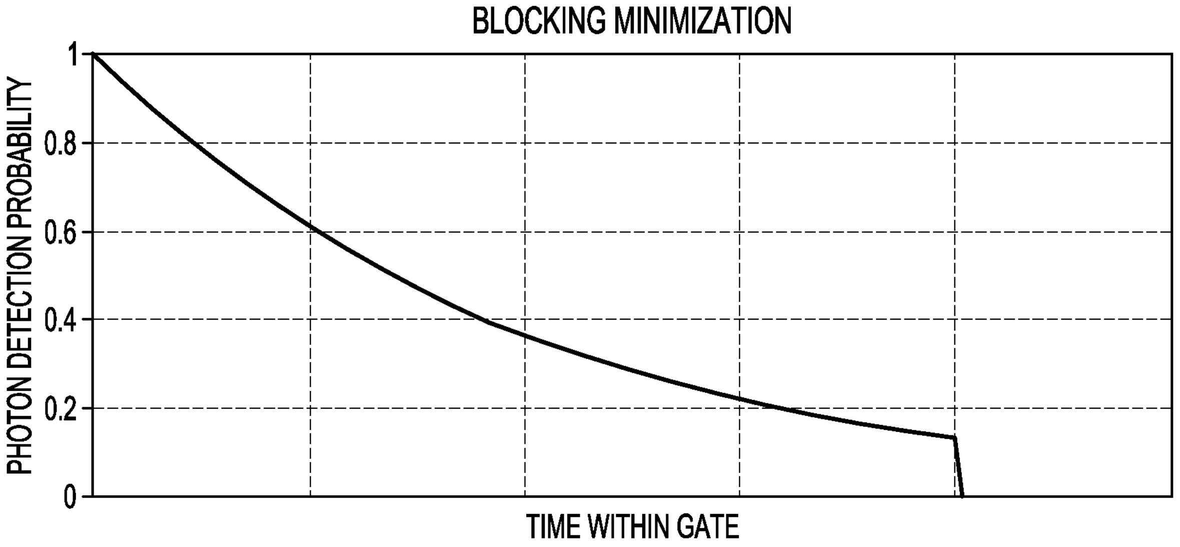
FIG. 3A illustrates blocking minimization for a framed Geiger-mode LADAR system, in accordance with some embodiments.

FIG. 3A illustrates blocking minimization, in accordance with some embodiments. Current high-sensitivity LADARs use Geiger-mode detectors (GmAPDs) to enable single-photon detection. While GmAPDs are extraordinarily sensitive, they suffer from blocking loss, leading to a drop in sensitivity over the extent of a frame, as a function of the background rate. In addition, GmAPDs have a read-out period at the end of each frame, during which no photons are detected. In FIG. 3A, the photon detection probability is illustrated as a function of time within the gate. The photon detection probability may be represented as:

$$p(t) = \begin{cases} \exp(-\lambda_b t), & t \le T - \tau \\ 0, & \text{otherwise} \end{cases},$$

where $\lambda_b$ is the background rate, and $\tau$ is the read-out period.

Figure 3B:
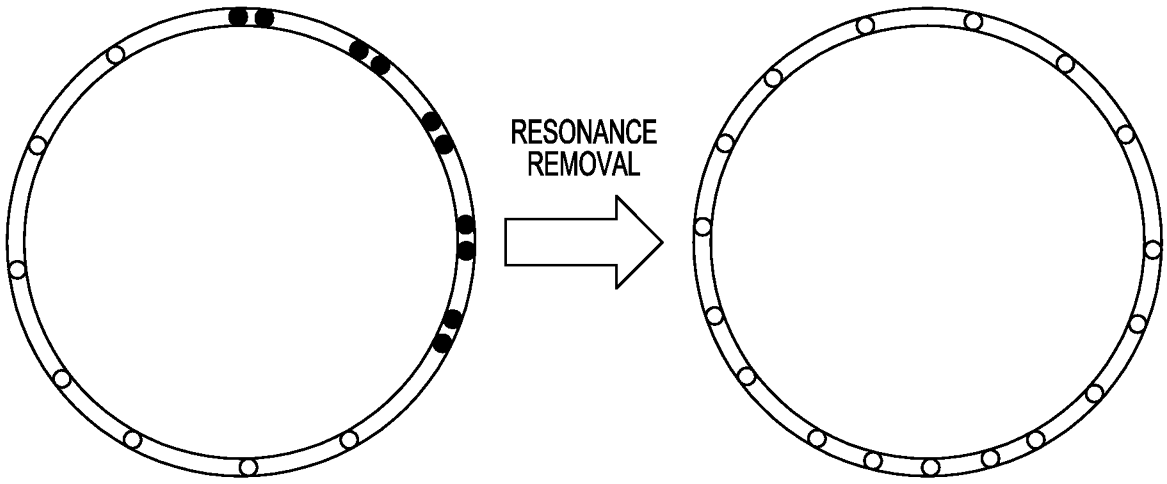
FIG. 3B illustrates resonance removal for a framed Geiger-mode LADAR system, in accordance with some embodiments.

FIG. 3B illustrates resonance removal, in accordance with some embodiments. As illustrated in FIG. 3B, prior to resonance removal, the spacing between pulses (shown as circles around the circumference) is not uniform, some are close together and some are further apart. After resonance removal, pulses are more evenly spaced.

Figure 3C:
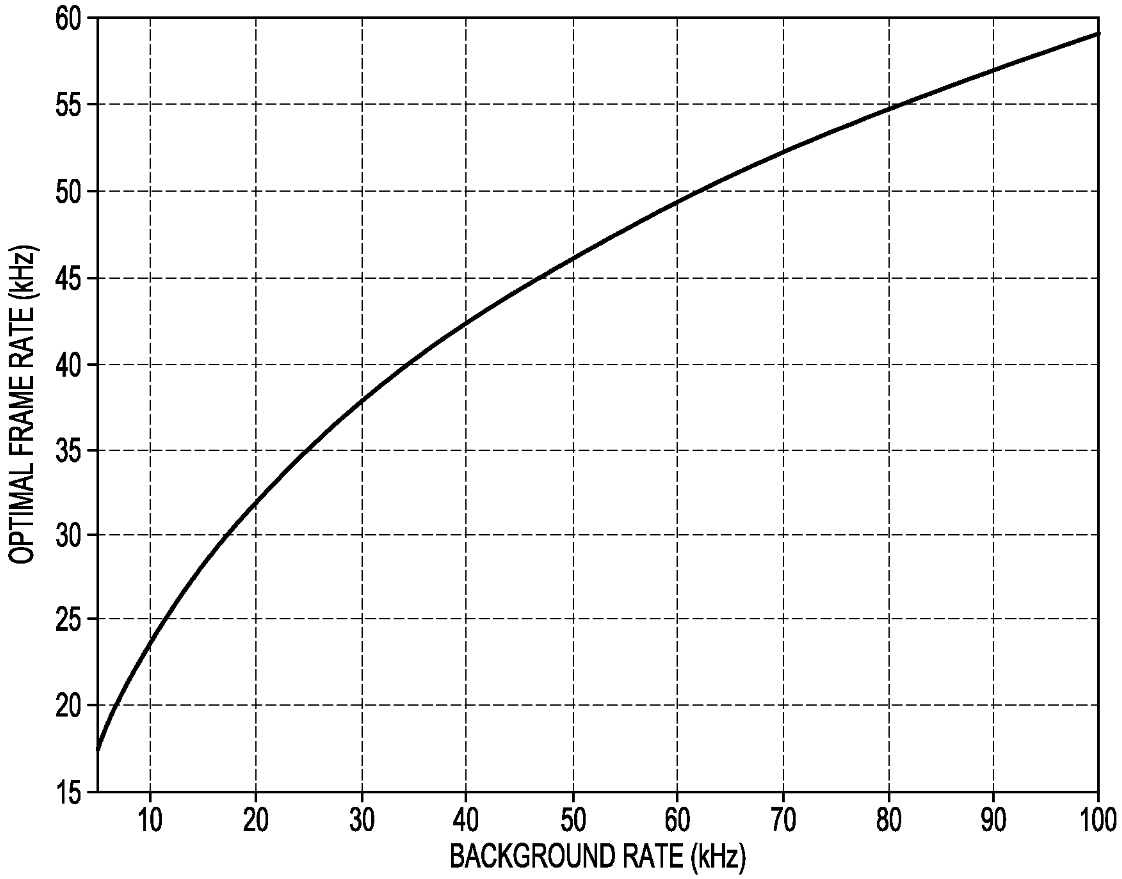
FIG. 3C illustrates background rate vs optimal frame rate, in accordance with some embodiments.

FIG. 3C illustrates background rate vs optimal frame rate, in accordance with some embodiments.

Figure 4A:
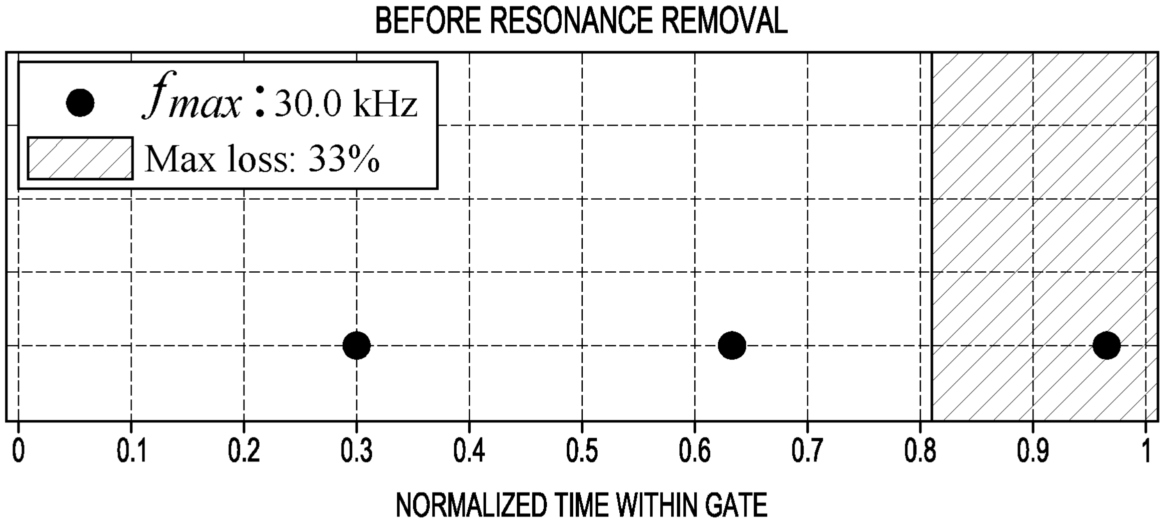
FIG. 4A illustrates pulse returns in gate before resonance removal, in accordance with some embodiments.

FIG. 4A illustrates pulse returns in gate before resonance removal, in accordance with some embodiments. In general, LADAR returns will arrive at the detector with an unknown temporal offset, due to the target range. When the target's range uncertainty is larger than the frame period, then the observer's a priori expectation of position of the return pulses in the frame of the camera is uniformly distributed across the frame. For example, if the PRF is 90 kHz and the frame-rate is 30 kHz, then the returns for a N=1000 pulse transmit sequence may appear in the range-gate as show in FIG. 4A. Here, a resonance is present, because the frame-rate and PRF are in a "simple" rational ratio (3-to-1). Resonances minimize the minimum signal that the LADAR may receive, over all possible ranges (i.e., in-gate cyclical shifts) from which the signal might return, thus reducing system sensitivity.

In accordance with embodiments, minimizing the maximum lost signal is equivalent to reducing clustering of pulse returns in the reference frame of the gates. Minimizing clustering is equivalent to maximizing the minimum distance between N consecutive return pulses, in the reference frame of the gate. To maximize the signal, clustering is eliminated while maintaining an FRF as close as possible to the optimal GmAPD anti-blocking frame-rate.

In some embodiments, a resonance removal algorithm may be performed as follows:

Construct the N-th Farey sequence $\mathcal{F}^{(N)}$ (namely, the ordered sequence of all rational numbers less than or equal to unity with denominators less than or equal to N).

$$\text{Define } \Delta \equiv \text{mod}\left(\frac{FRF}{PRF}, 1\right).$$

$$\text{Find } \frac{p_-}{q_-} \equiv \max_{\mathcal{F}_i^{(N)}}\left(\mathcal{F}_i^{(N)} \le \Delta\right),$$

i.e., the largest element of $\mathcal{F}^{(N)}$ that is less than Δ, and $$\frac{p_+}{q_+} \equiv \min_{\mathcal{F}_i^{(N)}}\left(\mathcal{F}_i^{(N)} > \Delta\right),$$

i.e., the smallest element of $\mathcal{F}^{(N)}$ that is greater than or equal to Δ

$$\text{Let } \Delta' \equiv \frac{p_- + p_+}{q_- + q_+}$$

$$\text{Return } FRF' = \left(\left\lfloor \frac{FRF}{PRF} \right\rfloor + \Delta'\right) \cdot PRF$$

For example, for Read-out time: 7 micro-seconds (μs) and a background rate: 17.5 kHz, an optimal frame rate for GmAPD blocking and read-out may be determined using the following equation:

$$f_{max} = -\frac{\lambda_b}{w(-\exp(-(\lambda_b \tau + 1))) + 1} = 30 \text{ kHz},$$

In the above, equation, the quantity $f_{max}$ is equal to the FRF, and that by using the Farey sequence methodology described above, one can calculate a resonance-removed framerate (FRF') (i.e., one for which the clustering is minimized for a PRF-90 kHz) of 30.02997 kHz. In these embodiments, the frame rate may be adjusted to reduce or remove resonances. This two-step process maximizes GmAPD sensitivity to returns while also removing resonances. In some embodiments, a framed Geiger-mode LADAR system may achieve up to a 20% or more increase in sensitivity.

Figure 4B:
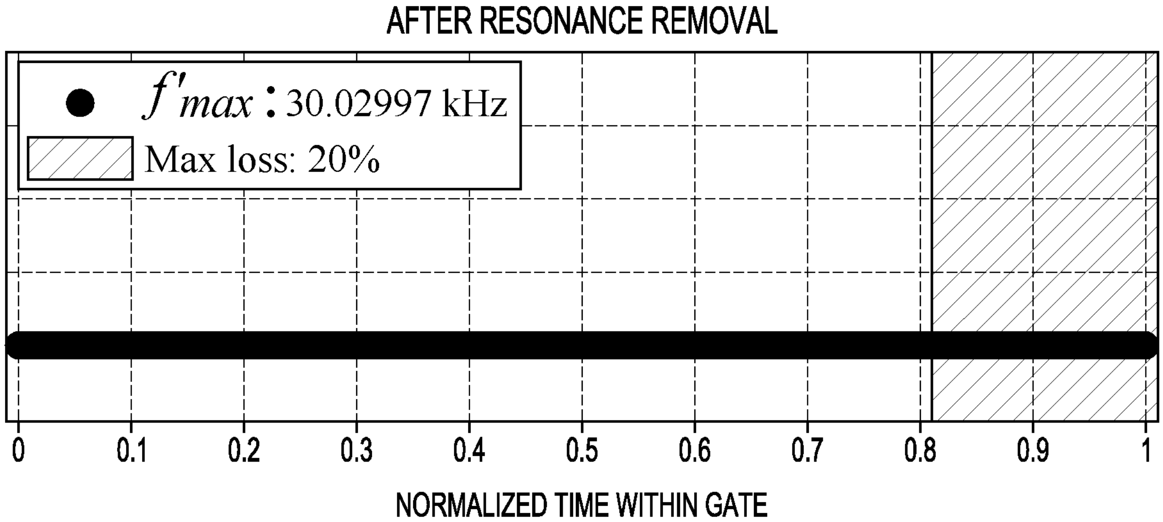
FIG. 4B illustrates pulse returns in gate after resonance removal, in accordance with some embodiments.

FIG. 4B illustrates pulse returns in gate after resonance removal, in accordance with some embodiments. As shown in FIG. 4B, returns are space evenly across the normalized time with the gate.

As discussed above, embodiments are directed to a framed Geiger-mode laser detection and ranging (LADAR) system that includes signal processing circuitry configured to select an initial frame rate to maximize sensitivity of a Geiger-mode Avalanche Photodiode (GmAPD) detector. In these embodiments, the signal processing circuitry may adjust the initial frame rate to reduce and/or remove system resonances to determine a final (i.e., more-optimal) frame rate. In these embodiments, the signal processing circuitry may process LADAR pulse returns using the final frame rate.

In these embodiments, the initial frame rate may be a pre-optimal frame rate and the final frame rate may be an optimal frame rate which optimizes the overall detection probability, as a function of the background rate of the system and read-out time, although the scope of the embodiments is not limited in this respect. In some embodiments, up to a 20% or more increase in sensitivity may result, although the scope of the embodiments is not limited in this respect.

In some embodiments, the initial frame rate may be an initial optimal anti-blocking frame-rate. In some embodiments, to adjust the initial frame rate to remove system resonances, the signal processing circuitry may be configured to reduce (e.g., minimize) clustering of the LADAR pulse returns in a reference frame of a gate, the gate triggered by the GmAPD detector, although the scope of the embodiments is not limited in this respect. In these embodiments, the gate may refer to the window of time that the LADAR system processes return signals after each transmitted pulse. In these embodiments, the system resonances may include resonances due to groups of return pulses close to each other and groups return pulses spaced further apart from each other. After reduction and/or removal of system resonances, the final frame rate results in the return pulses that may be move evenly spaced.

In some embodiments, to reduce the clustering of pulse returns, the signal processing circuitry may be configured to maximize a minimum distance between adjacent LADAR pulse returns in the reference frame of the gate, although the scope of the embodiments is not limited in this respect.

In some embodiments, to adjust the initial frame rate to remove system resonances, the signal processing circuitry may be configured to: construct an N-th order Farey sequence $\mathcal{F}^{(N)}$; identify a largest element $$\frac{p_-}{q_-}$$

of the Farey sequence that is less than $\Delta$ and a smallest element $$\frac{p_+}{q_+}$$

of the Farey sequence that is greater than or equal to $\Delta$, where $$\Delta \equiv \mathrm{mod}\left(\frac{FRF}{PRF}, 1\right),$$

where FRF is a frame repetition frequency corresponding to the initial frame rate and PRF is a pulse repetition frequency of the LADAR system; and determine the final frame rate (FRF') using the following equation:

$$FRF' = \left(\left\lfloor \frac{FRF}{PRF} \right\rfloor + \Delta'\right) \cdot \frac{FRF}{PRF}$$

$$\text{where } \Delta' \equiv \frac{p_- + p_+}{q_- + q_+}.$$

In some embodiments, N is a floor of a product of an expected dwell time and the PRF of the LADAR system. In these embodiments, N may be a natural number less an 100 million, although the scope of the embodiments is not limited in this respect.

In some embodiments, the initial frame rate may be selected to maximize a signal to noise ratio (SNR) (i.e., minimizing lost signal), although the scope of the embodiments is not limited in this respect. In some embodiments, the initial frame rate may be calculated by the signal processing circuitry based on the following equation:

$$f_{initial} = -\frac{\lambda_b}{w(-\exp(-(\lambda_b\tau + 1))) + 1}$$

In these embodiments, $\lambda_b$ is a background rate of the LADAR system as measured in photo-events per unit time, $\tau$ is a read-out period of the GmAPD detector, and $\mathcal{W}$ is a Lambert W function, although the scope of the embodiments is not limited in this respect. In these embodiments, the read-out period is a period at the end of each frame when no photons are detected.

In some embodiments, the background rate may be based on a number of photo events at the GmAPD detector. In some embodiments, the system may include memory that is configured to store the final frame rate.

Some embodiments are directed to non-transitory computer-readable storage medium that stores instructions for execution by signal processing circuitry of a framed Geiger-mode laser detection and ranging (LADAR) system. In these embodiments, the signal processing circuitry may be configured to select an initial frame rate to maximize sensitivity of a Geiger-mode Avalanche Photodiode (GmAPD) detector, adjust the initial frame rate to reduce and/or remove system resonances to determine a final (i.e., more-optimal) frame rate and process LADAR pulse returns using the final frame rate.

Some embodiments are directed to a method performed by signal processing circuitry of a framed Geiger-mode laser detection and ranging (LADAR) system. In these embodiments, the method may comprise selecting an initial frame rate to maximize sensitivity of a Geiger-mode Avalanche Photodiode (GmAPD) detector, adjusting the initial frame rate to reduce and/or remove system resonances to determine a final (i.e., more-optimal) frame rate, and processing LADAR pulse returns using the final frame rate. Some embodiments are directed to an apparatus for a framed Geiger-mode laser detection and ranging (LADAR) system comprising signal processing circuitry and memory.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a framed Geiger-mode laser detection and ranging (LADAR) system, the apparatus comprising: signal processing circuitry; and memory, wherein the signal processing circuitry is configured to:

select an initial frame rate to maximize sensitivity of a Geiger-mode Avalanche Photodiode (GmAPD) detector;

construct an N-th order Farey sequence $F^{(N)}$;

identify a largest element $p^-/q^-$ of the Farey sequence that is less than or equal to $\Delta$ and a smallest element $p^+/q^+$ of the Farey sequence that is greater than $\Delta$, where $\Delta \equiv \mathrm{mod}(FRF/PRF, 1)$, FRF is the initial frame rate and PRF is a pulse repetition frequency of the LADAR system; and determine a final frame rate (FRF') using the following equation:

$$FRF'=(\lfloor FRF/PRF \rfloor+\Delta')\cdot PRF \quad \text{where} \quad \Delta' \equiv (p^-+p^+)/(q^-+q^+)$$

adjust the initial frame rate to the final frame rate to reduce system resonances; and process LADAR pulse returns using the final frame rate.

2. The apparatus of claim 1, wherein the initial frame rate is an initial optimal anti-blocking frame-rate.

3. The apparatus of claim 1, wherein to adjust the initial frame rate to the final frame rate to remove system resonances, the signal processing circuitry is configured to reduce clustering of the LADAR pulse returns in a reference frame of a gate, the gate triggered by the GmAPD detector.

4. The apparatus of claim 3, wherein to reduce the clustering of pulse returns, the signal processing circuitry is configured to maximize a minimum distance between adjacent LADAR pulse returns in the reference frame of the gate.

5. The apparatus of claim 1, wherein N is a floor of a product of an expected dwell time and the PRF of the LADAR system.

6. The apparatus of claim 1, wherein the initial frame rate is selected to maximize a signal to noise ratio (SNR).

7. The apparatus of claim 1, wherein the initial frame rate is calculated by the signal processing circuitry based on the following equation:

$$f_{max} = -\frac{\lambda_b}{w(-\exp(-\lambda_b\tau+1)))+1}$$

wherein $\lambda_b$ is a background rate of the LADAR system in photo-events per unit time, r is a read-out period of the GmAPD detector, and W is a Lambert W function.

8. The apparatus of claim 7, wherein the background rate is based on a number of photo events at the GmAPD detector.

9. The apparatus of claim 1, wherein the memory is configured to store the final frame rate.

10. A non-transitory computer-readable storage medium that stores instructions for execution by signal processing circuitry of a framed Geiger-mode laser detection and ranging (LADAR) system, wherein the signal processing circuitry is configured to:

select an initial frame rate to maximize sensitivity of a Geiger-mode Avalanche Photodiode (GmAPD) detector;

construct an N-th order Farey sequence $F^{(N)}$;

identify a largest element $p^-/q^-$ of the Farey sequence that is less than or equal to $\Delta$ and a smallest element $p^+/q^+$ of the Farey sequence that is greater than $\Delta$, where $\Delta$=mod(FRF/PRE, 1), FRF is the initial frame rate and PRF is a pulse repetition frequency of the LADAR system; and determine a final frame rate (FRF') using the following equation:

$$FRF'=(\lfloor FRF/PRF \rfloor+\Delta')\cdot PRE \quad \text{where} \quad \Delta' \equiv (p^-+p^+)/(q^-+q^+)$$

adjust the initial frame rate to the final frame rate to reduce system resonances; and process LADAR pulse returns using the final frame rate.

11. The non-transitory computer-readable storage medium of claim 10, wherein to adjust the initial frame rate to the final frame rate to remove system resonances, the signal processing circuitry is configured to reduce clustering of the LADAR pulse returns in a reference frame of a gate, the gate triggered by the GmAPD detector.

12. The non-transitory computer-readable storage medium of claim 11, wherein to reduce the clustering of pulse returns, the signal processing circuitry is configured to maximize a minimum distance between adjacent LADAR pulse returns in the reference frame of the gate.

13. The non-transitory computer-readable storage medium of claim 10, wherein N is a floor of a product of an expected dwell time and the PRF of the LADAR system.

14. The non-transitory computer-readable storage medium of claim 12, wherein the initial frame rate is calculated by the signal processing circuitry based on the following equation:

$$f_{max} = -\frac{\lambda_b}{w(-\exp(-\lambda_b\tau+1)))+1}$$

wherein $\lambda_b$ is a background rate of the LADAR system in photo-events per unit time, $\tau$ is a read-out period of the GmAPD detector, and W is a Lambert W function.

15. A method performed by signal processing circuitry of a framed Geiger-mode laser detection and ranging (LADAR) system, the method comprising:

selecting an initial frame rate to maximize sensitivity of a Geiger-mode Avalanche Photodiode (GmAPD) detector;

constructing an N-th order Farey sequence $F^{(N)}$;

identifying a largest element $p^-/q^-$ of the Farey sequence that is less than or equal to $\Delta$ and a smallest element $p^+/q^+$ of the Farey sequence that is greater than $\Delta$, where $\Delta$≡mod(FRF/PRE, 1), FRF is the initial frame rate and PRF is a pulse repetition frequency of the LADAR system; and determining a final frame rate (FRF') using the following equation:

$$FRF'=(\lfloor FRF/PRF \rfloor+\Delta')\cdot PRF \quad \text{where} \quad \Delta' \equiv (p^-+p^+)/(q^-+q^+)$$

adjusting the initial frame rate to the final frame rate to reduce system resonances; and processing LADAR pulse returns using the final frame rate.

16. The method of claim 15, wherein to adjust the initial frame rate to the final frame rate to remove system resonances, the method further comprises reducing clustering of the LADAR pulse returns in a reference frame of a gate, the gate triggered by the GmAPD detector.

17. The method of claim 15, wherein the initial frame rate is calculated by the signal processing circuitry based on the following equation:

$$f_{max} = -\frac{\lambda_b}{w(-\exp(-\lambda_b\tau+1)))+1}$$

wherein $\lambda_b$ is a background rate of the LADAR system in photo-events per unit time, $\tau$ is a read-out period of the GmAPD detector, and W is a Lambert W function.

* * * * *